United States Patent [19]

Werner

[11] Patent Number: 5,033,051
[45] Date of Patent: Jul. 16, 1991

[54] METHOD OF CONVERTING LASER RADIATION INTO ANOTHER WAVELENGTH RANGE BY RAMAN SCATTERING AND APPARATUS FOR IMPLEMENTING THE METHOD

[75] Inventor: Linus Werner, Neuss, Fed. Rep. of Germany

[73] Assignee: Uranit GmbH, Jülich, Fed. Rep. of Germany

[21] Appl. No.: 538,717

[22] Filed: Jun. 15, 1990

[30] Foreign Application Priority Data

Jun. 16, 1989 [DE] Fed. Rep. of Germany ....... 3919673

[51] Int. Cl.$^5$ .............................................. H01S 3/30
[52] U.S. Cl. ......................................... 372/3; 372/39; 372/69; 307/425; 307/426
[58] Field of Search ...................... 372/3, 69; 307/425, 307/426

[56] References Cited

U.S. PATENT DOCUMENTS

| Re. 30,898 | 4/1982 | Cantrell et al. | 307/426 |
|---|---|---|---|
| 4,254,348 | 3/1981 | Stappaerts | 357/426 |
| 4,280,109 | 7/1981 | Stappaerts | 307/425 |
| 4,633,103 | 12/1986 | Hyman et al. | 372/3 |

FOREIGN PATENT DOCUMENTS 2034962A 6/1980 United Kingdom.

OTHER PUBLICATIONS

H. F. Dobele et al., "Tuning Ranges of KrF and ArF Excimer Laser Amplifiers and of Associated Vacuum Ultraviolet Anti–Stokes Raman Lines", *Applied Physcis B, Photophysics and Laser Chemistry*, pp. 67–72.

P. Rabinowitz et al., "Stimulated Rotational Raman Scattering from Para-$H_2$ Pumped by a $CO_2$ TEA Laser", Optics Letters, vol. 3, No. 4, Oct. 1978, pp. 147–148.

John L. Carlsten et al., "Stimulated Rotational Raman Scattering in $CO_2$-Pumped Para-$H_2$", IEEE Journal of Quantum Electronics, vol. QE-19, No. 9, Sep. 1983, pp. 1407–1413.

Robert L. Byer et al., "16-$\mu m$ Generation by $CO_2$--Pumped Rotational Raman Scattering in $H_2$", Optics Letters, vol. 3, No. 4, Oct. 1978, pp. 144–146.

*Primary Examiner*—Leon Scott, Jr.
*Attorney, Agent, or Firm*—Spencer & Frank

[57] ABSTRACT

A method of converting the laser radiation of a pump laser into another wavelength range by stimulated Raman scattering in which the laser radiation of the pump laser is conducted through a Raman medium, thus generating Stokes radiation in the other wavelength range, and an arrangement for implementing the method. The laser radiation from the pump laser leaving the Raman medium and the generating Stokes radiation are fed together to an amplifier for the laser radiation of the pump laser, and the thus amplified laser radiation of the pump laser is conducted together with the accompanying Stokes radiation through a further Raman medium for conversion of the amplified laser radiation of the pump laser into Stokes radiation.

10 Claims, 1 Drawing Sheet

METHOD OF CONVERTING LASER RADIATION INTO ANOTHER WAVELENGTH RANGE BY RAMAN SCATTERING AND APPARATUS FOR IMPLEMENTING THE METHOD

REFERENCE TO RELATED APPLICATIONS

This application claims the priority of Federal Republic of Germany application Serial No. P 38 12 494.7 filed Apr. 15th, 1988, which is incorporated herein by reference.

BACKGROUND OF THE INVENTION

The present invention relates to a method of converting laser radiation from a pump laser into another wavelength range by stimulated Raman scattering in which the laser radiation of the pump laser is conducted through a Raman medium, thus generating Stokes radiation in the other wavelength range. The invention also relates to an apparatus for implementing the method.

A method and an arrangement of this type have been described by P. Rabinowitz, A. Stein, R. Brickman and A. Kaldor in an article entitled, "Stimulated Rotational Raman Scattering From Para-$H_2$ Pumped by a $CO_2$-TEA Laser," in the periodical *Optics Letters*, Volume 3, No. 4, October, 1978, pages 147-148. Here, stimulated Raman scattering of a $CO_2$ pump laser beam in para-$H_2$ generates Stokes radiation in a range of 16 $\mu$m, as it is required for the isotope selective excitation of $UF_6$ molecules in a molecular laser process.

However, for an effective conversion of this pump radiation into a wavelength range of 16 $\mu$m, the peak power required for the $CO_2$ radiation is so high that the optical components employed in the laser and in the conversion apparatus are under considerable stress. Moreover, with the high peak power involved, the danger is very high that radiation induced gas breakthroughs occur in the Raman medium which prevent Raman conversion.

A method and an arrangement which permit a reduction of the peak power of the $CO_2$ pump radiation while maintaining good conversion efficiency is disclosed by J. L. Carlsten and R. G. Wenzel in an article entitled, "Stimulated Rotational Raman Scattering in $CO_2$-Pumped Para-$H_2$," in the periodical, *IEEE Journal of Quantum Electronics*, Volume QE-19, No. 9, September, 1983, pages 1407-1413. The reduction of the peak power is realized in that seed radiation from a seed laser is radiated into the conversion apparatus simultaneously and colinearly with the pump radiation.

However, the required tuning of the wavelength of the seed laser radiation to the Stokes radiation determined by the wavelength of the pump radiation is difficult and expensive. Moreover, it is not easy to bring the seed radiation together with the pump radiation, to synchronize it in time and to cause it to overlap in space to a satisfactory degree.

A method and an arrangement in which the seed radiation is not furnished by a seed laser but is generated by the technology of four-wave mixing is disclosed by R. L. Byer and W. R. Trutna in an article entitled "16 $\mu$m Generation by $CO_2$-Pumped Rotational Raman Scattering in $H_2$," in the periodical *Optics Letters*, Volume 3, No. 4, October, 1978, pages 144-146. In this method, the radiation of a short-wave auxiliary laser must be reflected into the conversion apparatus simultaneously and colinearly with the pump radiation. Due to the greater Raman amplification at the shorter wavelength, the radiation of the auxiliary laser is converted by Raman conversion immediately upon entering the conversion apparatus. In the presence of the pump radiation, the Stokes radiation is here also generated at the wavelength determined by the pump radiation and it then acts as a seed radiation.

The thus generated seed radiation thus automatically has the correct wavelength. But there remains the difficulty of bringing together the pump radiation and the radiation of the auxiliary laser, to synchronize them in time and to cause them to suitably overlap in space.

SUMMARY OF THE INVENTION

It is an object of the present invention to provide a method and an arrangement for converting the laser radiation of a pump laser into a different wavelength by means of stimulated Raman scattering in which it is possible, even without the use of an additional seed laser or auxiliary laser, to realize an efficient conversion of the laser radiation of the pump laser into the desired Stokes radiation while keeping the peak power of the pump laser relatively low.

The above object is generally achieved according to the present invention by a method for converting the laser radiation from a pump laser into another wavelength range by stimulated Raman scattering, which comprises: conducting the laser radiation of a pump laser through a Raman medium to thus generate Stokes radiation in the other wavelength range by stimulated Raman scattering; feeding the laser radiation from the pump laser leaving the Raman medium and the generated Stokes radiation to an amplifier for the laser radiation of the pump laser; and conducting the thus amplified laser radiation of the pump laser together with the accompanying Stokes radiation through a further Raman medium for conversion of the amplified laser radiation of the pump laser into Stokes radiation of the other wavelength range.

According to the preferred embodiment of the invention the pump laser is a $CO_2$ laser, the Raman medium is para-$H_2$, and the amplifier is a $CO_2$ laser amplifier. Moreover, according to a feature of the invention, a plurality of units, each including the series connection of a Raman cell with a Raman medium and an amplifier for the pump radiation wavelength, may be connected in series between the pump laser and the final power Raman cell, whereby the peak pulse power of the pump laser may be further reduced.

In the present invention, the Stokes radiation generated in the first Raman medium following the pump laser is utilized as the basis for the seed radiation. The peak power of the pump laser is here selected to be so low that the conversion in the Raman medium moves primarily in the low signal domain. Therefore, the shape of the pumping pulse, although weakened by reflection losses in the conversion apparatus, is hardly changed at all. The power of the Stokes radiation which is generated in the Raman medium simultaneously and colinearly with the radiation of the pump laser is nevertheless increased by several orders of magnitude, typically nine to twelve, counting from the starting value given by the spontaneous Raman scattering.

The weakened pumping pulse is then conducted, together with the accompanying Stokes radiation, into an amplifier for the pump radiation and is amplified there, for example to its starting value before entering into the Raman medium. Although this weakens the accompanying Stokes radiation, this weakening typically amounts to only one or two orders of magnitude. Thus, a considerable net gain in Stokes radiation is still realized. The thus amplified pump radiation is now conducted together with the Stokes radiation through a further Raman medium. Here a very effective conversion of the pump radiation into Stokes radiation takes place, since the accompanying Stokes radiation from the amplifier acts similarly to the above-mentioned seed radiation, while wavelength tuning is no longer required. Moreover, the optimum spatial overlap of seed radiation and pump radiation occurs automatically. Additionally, seed radiation and pump radiation are synchronized in time.

One embodiment of the invention will be described below in greater detail with reference to the drawing figures.

DETAILED DESCRIPTION OF THE PREFERRED EMBODIMENT

Figures 1, 2A, 2B:
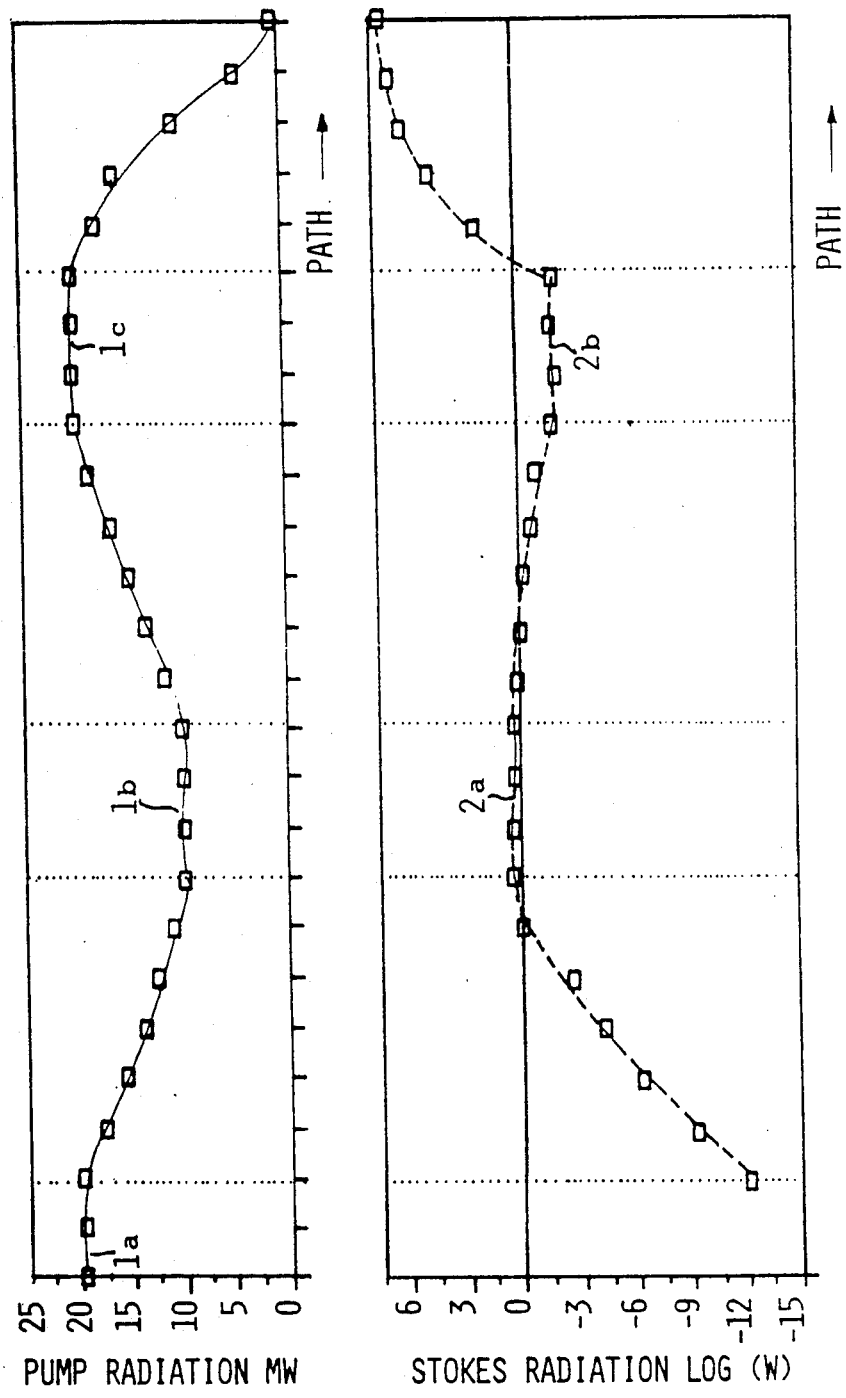
FIG. 1 is a schematic representation of the structural arrangement according to the invention.
FIG. 2a is a diagrammatic illustration of the peak power of the laser radiation of the pump laser in microwaves plotted over the path of the laser radiation through the arrangement of FIG. 1.
FIG. 2b is a diagrammatic illustration of the Stokes radiation (log W) over the same path through the arrangement.

As shown in FIG. 1, a $CO_2$ pump laser 1 producing a peak pulse power of about 20 MW or less and emitting a laser radiation in a wavelength range of 10 $\mu$m serves to generate the pump radiation indicated by the solid line 1a. With this peak pulse power there generally is no danger yet of adverse influences on optical components or of breakthroughs in the Raman medium. This radiation 1a is conducted through a Raman cell 2 which serves as the conversion apparatus and which is filled with para-$H_2$ to 300 K as the Raman medium. In the present application, the cell 2 performs the function of a preamplifier for the desired Stokes radiation. In this cell 2, stimulated rotational Raman scattering converts the radiation 1a into Stokes radiation of the desired wavelength range of 16 $\mu$m as indicated by the dashed line 2a. This conversion in the cell 2 causes the original pump radiation 1a to be weakened by reflection losses resulting in a lower powered pump radiation 1b exiting the cell 2. The decrease in power of the pump radiation can be seen in FIG. 2a. On the other hand, the Stokes radiation produced in the cell 2 rises from a starting value of about $10^{-12}$ W to about 1 W at the end of cell 2 as shown in FIG. 2b.

The attenuated laser radiation 1b from pump laser 1 leaving Raman cell 2 and the Stokes radiation 2a leaving Raman cell 2 are fed together to a $CO_2$ laser amplifier 3 in which the pump radiation 1b of 10 $\mu$m wavelength range is again increased approximately to its original value of 20 MW, i.e. 1c as shown in FIG. 2a. Since amplifier 3 absorbs in the wavelength range of the Stokes radiation, i.e., 16 $\mu$m, the Stokes radiation is attenuated by one to two orders of magnitude. Although this appears to be a drawback, it can be seen in the diagram of FIG. 2b that a sufficiently large net gain of 16 $\mu$m Stokes radiation 2b remains at the output of amplifier 3 as seed radiation for the subsequently connected power stage 4. This power stage 4 is composed of a further Raman cell which is likewise filled with para-$H_2$. Because of the accompanying Stokes radiation 2b which is introduced together with the pump radiation to the cell or power stage 4, the 10 $\mu$m pump radiation 1c is very effectively converted in this power stage 4 to the desired 16 $\mu$m Stokes radiation. As can be seen in FIG. 2a, the power of the pump radiation drops considerably on its path though power stage 4, while the power of the 16 $\mu$m Stokes radiation increases over the same path by about six orders of magnitude, that is, from a starting value of less than 1 Watt to above $10^6$ Watt.

If it is desired to further reduce the peak pulse power of pump laser 1, several units 2, 3, each including the series connection of a preamplifier 2 for Stokes radiation 2a and an amplifier 3 for pump radiation 1b, can be connected in series between the pump laser 1 and the power stage 4.

The invention now being fully described, it will be apparent to one of ordinary skill in the art that any changes and modifications can be made thereto without departing from the spirit or scope of the invention as set forth herein.

I claim:

1. A method for converting laser radiation from a pump laser into another wavelength range by stimulated Raman scattering, comprising:
   conducting the laser radiation of a pump laser through a Raman medium to thus generate Stokes radiation in the another wavelength range by stimulated Raman scattering;
   feeding the laser radiation from the pump laser leaving the Raman medium and the generated Stokes radiation to an amplifier for the laser radiation of the pump laser to amplify only the laser radiation; and
   subsequently conducting the thus amplified laser radiation of the pump laser together with the accompanying Stokes radiation through a further Raman medium to convert the amplified laser radiation of the pump laser into Stokes radiation.

2. A method as defined in claim 1 wherein the laser is a $CO_2$ laser and the Raman medium is para-$H_2$.

3. An arrangement as defined in claim 2, including at least one further Raman cell, containing para-$H_2$, followed by a further $CO_2$ laser amplifier connected in series between said $CO_2$ pump laser and said first Raman cell.

4. An arrangement for implementing the method defined in claim 1, comprising: a $CO_2$ pump laser emitting in a wavelength range of 10 $\mu$m followed by a first Raman cell, filled with para-$H_2$ as said Raman medium, in which the 10 $\mu$m laser radiation of the $CO_2$ pump laser is converted so as to generate Stokes radiation in a wavelength range of 16 $\mu$m;
   a $CO_2$ laser amplifier which receives the pump radiation and the Stokes radiation from said first Raman cell and amplifies the received pump radiation; and
   a second Raman cell, filled with para-$H_2$ as the Raman medium, which receives the amplified pump radiation and the Stokes radiation output of said $CO_2$ laser amplifier.

5. A method as defined in claim 1 wherein the laser radiation is amplified in the amplifier substantially to its original value as produced by the pump laser prior to entering the Raman medium, while the Stokes radiation is reduced in the amplifier.

6. Apparatus for converting the laser radiation from a pump laser into another wavelength range by stimulated Raman scattering comprising:
- a pump laser producing radiation at a first wavelength;
- first means, containing a Raman medium, for receiving the radiation from said pump laser, and for generating Stokes radiation at a second wavelength different than said first wavelength by stimulated Raman scattering;
- second means for receiving output radiation, including pump radiation at said first wavelength and Stokes radiation at said second wavelength, from said first means and for amplifying said pump radiation at said first wavelength; and
- third means, containing a Raman medium, for receiving amplified pump radiation of said first wavelength and Stokes radiation at said second wavelength from said second means and for converting said amplified pump radiation at said first wavelength to Stokes radiation at said second wavelength by stimulated Raman scattering.

7. Apparatus as defined in claim 5 wherein said second means is a laser amplifier.

8. Apparatus as defined in claim 7 wherein said first and third means are respective Raman cells containing the same said Raman medium.

9. Apparatus as defined in claim 8 wherein said laser is a $CO_2$ laser, and said laser amplifier is a $CO_2$ laser amplifier.

10. Apparatus as defined in claim 9 wherein said Raman medium is para-$H_2$.

* * * * *